Jan. 25, 1927.

E. S. CROCKER 1,615,360

FOUR-WHEEL TRUCK FOR MOTOR VEHICLES

Filed Jan. 30, 1926    2 Sheets-Sheet 1

INVENTOR,
Elmer S. Crocker
BY
A. K. Martell
ATTORNEY.

Jan. 25, 1927.
E. S. CROCKER
1,615,360
FOUR-WHEEL TRUCK FOR MOTOR VEHICLES
Filed Jan. 30, 1926    2 Sheets-Sheet 2
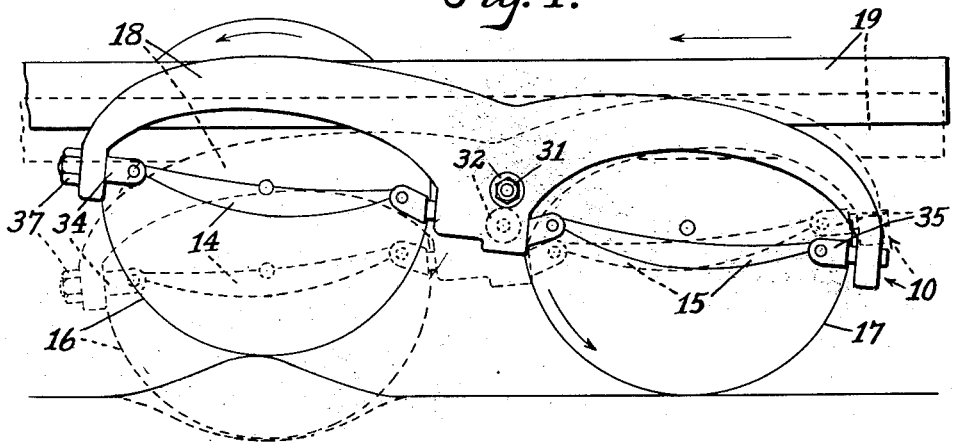
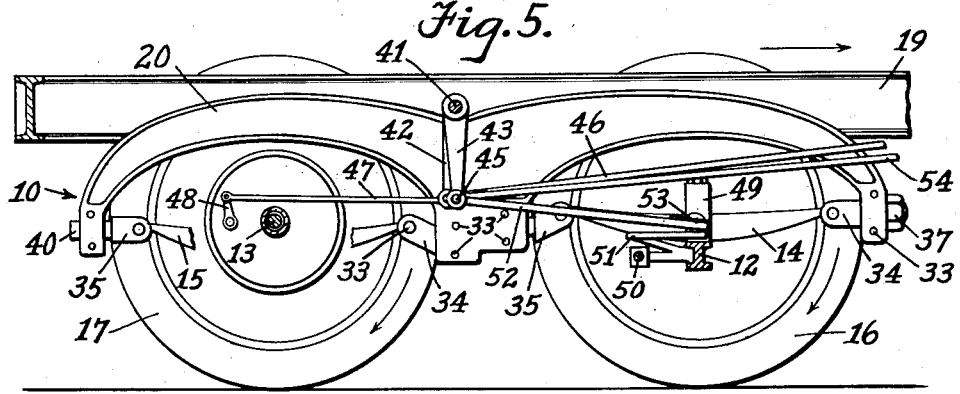
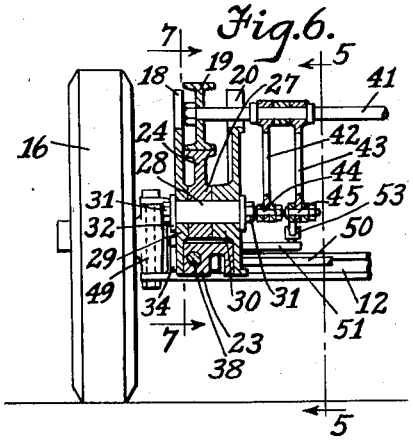
INVENTOR,
Elmer S. Crocker
BY
A. K. Martell
ATTORNEY.

Patented Jan. 25, 1927.

1,615,360

UNITED STATES PATENT OFFICE.

ELMER S. CROCKER, OF LOS ANGELES, CALIFORNIA, ASSIGNOR TO OLIVE R. FULLER, OF LOS ANGELES, CALIFORNIA.

FOUR-WHEEL TRUCK FOR MOTOR VEHICLES.

Application filed January 30, 1926. Serial No. 84,811.

My invention relates to motor vehicle construction and more particularly to a construction for heavy-traffic vehicles, such as motor busses and the class of freight carrying vehicles known as motor trucks. It is an improvement on the device shown in my application filed January 16, 1926, under Serial No. 81630, and is intended for a larger class of vehicles designed for heavier traffic.

The primary object of my invention is to provide a truck device for carrying the rear end, and therefore the major part of the load, of heavy-traffic motor vehicles, whereby the load is distributed on an enlarged wheel-base and is carried with a relatively small amount of jolting, over uneven streets or highways, so that the wear on pavings of streets and highways, and the wear and breakage of vehicle parts, as well as the damage to goods in transit, are materially reduced.

A further object is to provide a four-wheel truck-device, for use on a six-wheel motor vehicle, the front wheels of which are connected to the steering apparatus of the vehicle in such a manner as to be swerved simultaneously with the front wheels of the vehicle in such relative proportion thereto as to facilitate the turning of the vehicle, as a whole, on a relatively short radius, without excessive wear on the tires.

A still further object is to provide a rear-end truck of the character described which has ample traction and is equipped with brakes so connected that there is no tightening or loosening thereof when passing over rough roads.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

The preferred form of my invention is illustrated in the drawings which accompany this specification and in which Fig. 1, is a plan view of the rear end of a motor vehicle frame, equipped with a truck embodying the features of my invention.

Fig. 4, is a side-view similar to Fig. 2, but partly in diagram, illustrating the action of the truck when passing over uneven roads.

Fig. 5, is a vertical sectional view of the truck, taken on line 5—5 of Fig. 6.

Fig. 6, is a sectional view of the left side of the truck, taken on line 6—6 of Fig 2.

Fig. 7, is a fragmentary sectional view of the left side of the truck, taken on line 7—7 of Fig. 6.

Figure 1:
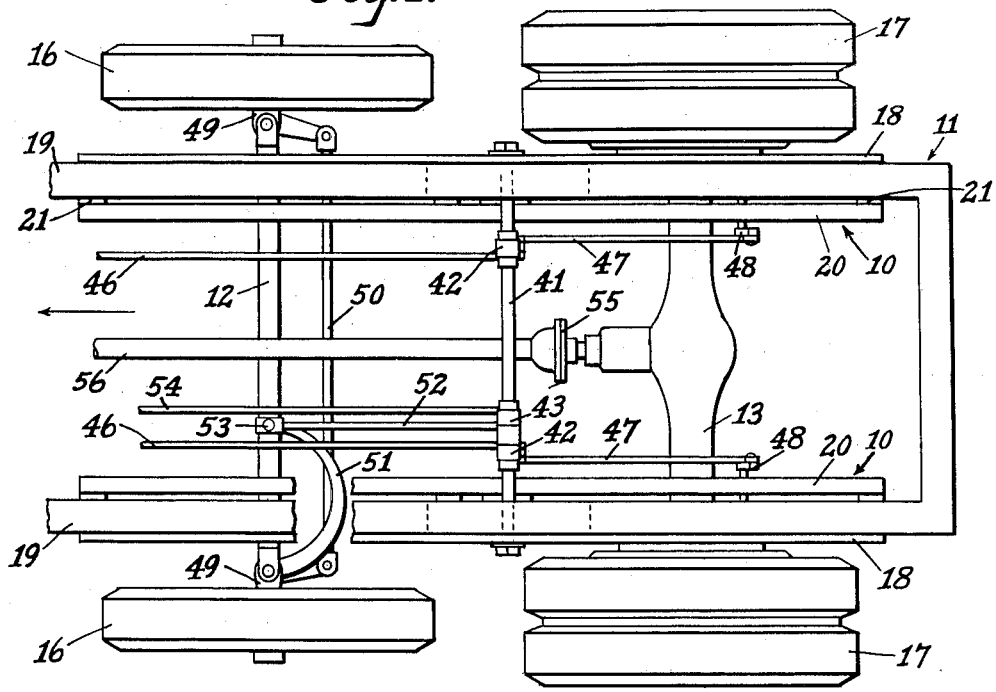
Figure 2:
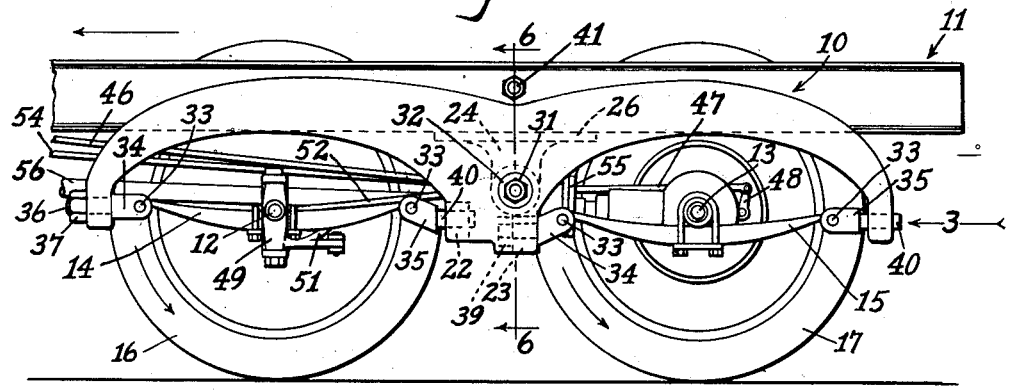
Fig. 2, is a left-side view of the frame and truck shown in Fig. 1.
Figure 3:
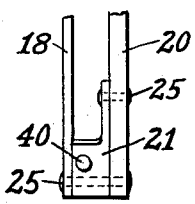
Fig. 3, is an end-view of one of the rocker members, as seen when looking in the direction indicated by arrow 3, in Fig. 2.

The present truck has some of the features shown in my former application, the modifications being mainly for the purpose of providing for a heavier type of vehicle than the former, and for adapting the truck for connection to the usual brake and steering apparatus.

This truck also comprises a pair of rocker members 10 pivoted to the frame 11 of the vehicle near its rear end, a front axle 12 and a rear axle 13 extending transversely between and beyond said rocker members, front springs 14 and rear springs 15 resting on said axles 12 and 13, respectively, and wheels 16 and 17 mounted on the ends of said front and rear axles, respectively.

The rocker members in the present type, however, are each made of two specially formed bars which coincide in size and form but which are of unequal thickness and weight. The outer and lighter bars 18 of the rocker members extend along the outer sides of the side-bars 19, of the vehicle frame, and the inner and heavier bars 20 extend along the inner sides thereof, the two being held in such spaced relation to each other as to provide ample clearance between them and said side-bars 19 by bearing blocks 21 at their ends, bearing blocks 22 and 23 adjacent their middle points and a supporting bracket 24 somewhat rearwardly from their middle points. They are held in fixed relation to each other by bolts or rivets 25 extending through blocks 21, 22 and 23. Each bracket 24 is provided with a flange 26 by which it is bolted or riveted to the under sides of side-bars 19 and also a bearing 27 in which is journaled a stub-shaft 28 which extends through bearings 29 and 30 in bars 18 and 20, respectively. The stub-shaft 28 is reduced at both ends and threaded to receive nuts 31. Washers 32, which bear against the outer faces of bars 18 and 20, and hold stub-shaft 28 in position, are placed under nuts 31.

By constructing each rocking member with an outer bar or plate 18 and an inner bar or plate 20, said plates being vertically disposed with relation to their breadth and being rigidly held in parallel spaced relation to each other, and by supporting the weight of the vehicle body between said plates, a vehicle supporting construction of superior lightness and strength is provided.

Springs 14 and 15 are clamped on axles 12 and 13, respectively, in the usual way, and their ends are fastened by pins 33 to a fixed shackle 34 at one end and a movable shackle 35 at the other. The fixed shackle of the front springs has a threaded shank 36 which extends through an aperture in front bearing block 21 in which it is adapted to turn, and a retaining nut 37 is screwed onto the projecting end thereof. Similarly the fixed shackle of the rear springs has a threaded shank 38 which extends through an aperture in bearing block 23 and a retaining nut 39 is screwed onto its projecting end. The movable shackle 35 of the front springs has a shank 40 which extends through an aperture in bearing-block 22 in which it fits loosely enough to move freely endwise, so as to allow the spring to lengthen and shorten as the load varies. Similarly the movable shackle of the rear spring has a shank 40 which extends through an aperture in rear bearing-block 21, whereby the rear spring is allowed to vary in length as the weight upon it varies. This method of attaching the springs to the rocker members eliminates all twisting stresses in the springs.

A cross-rod 41 has its ends fixed in side-bars 19 of the vehicle frame, directly above stub-shafts 28, so that it is held parallel to their common axis, and hanger arms 42 and 43 are mounted thereon so that their lower ends swing freely about the cross-rod as a pivot. Pivot pins 44 and 45 are fixed in the free ends of arms 42 and 43, respectively, the length of said hanger arms being such that pivot pins 44 and 45 swing in an arc passing through the common axis of stub-shafts 28. The usual brake rods 46 are attached to pivot pins 42 and extension rods 47 are connected between pins 42 and the usual brake arms 48, so that when the usual brake lever (not shown) is operated brake arms 48 are operated through hanger arms 42 and extension rods 47.

As shown in Figs. 1 and 6, axle 12 of the truck is of the regular front axle type, having the usual steering knuckles 49 and tie-rod 50. A relatively long arcuate lever arm 51 is fixed on the left steering knuckle and is connected to pivot-pin 45 of hanger arm 43 by a connecting rod 52, with a ball and socket joint 53. An extension steering rod 54 is connected to the usual steering lever of the vehicle (not shown) and to pivot-pin 45 so that steering knuckles 49 are moved by means of extension-rod 54, hanger-arm 43 and connecting-rod 52, simultaneously with the steering knuckles of the front axle of the vehicle, the length of lever arm 51 being adjusted so as to produce a movement of the former knuckles in such proportion to that of the latter, that the vehicle turns readily on a relatively short radius.

The action of the truck in reducing the jolting of the load when passing over uneven roads is illustrated in Fig. 4, its position when the front wheels are passing over a hump in the road being indicated by full lines and its position when passing over a depression in the road being indicated by dotted lines. It is evident that in either case the upward or downward movement of the load is only a fraction of that of the wheels and that comparatively smooth riding of the load is secured by the use of the truck. Furthermore the position of the axis of the stub-shafts 28 in relation to universal joint 55, of driving shaft 56, eliminates a large part of the usual wear and slip in the universal joint, and its position in relation to the front and rear axles insures ample traction and braking on the rear wheels, which are the drive wheels.

Each rocker member, with the springs attached thereto, turns on its stub-shafts 28 independently of the other, thus insuring free spring action on both sides of the truck, and the operation of the brakes by rods which pass through the axis of stub-shafts 28, the pivot axis of the truck, provides against any tightening or loosening of the brakes when passing over rough roads. Likewise the steering arm 51 of the truck being connected to the steering apparatus of the vehicle by rods which are pivoted in the axis of stub-shafts 28 provides against any action being transmitted to the steering apparatus of the truck by the action of the wheels when passing over rough ground.

Having thus illustrated and described my invention, I claim:

1. In a four-wheel truck for motor vehicles adapted for attachment to the side bars of a vehicle frame, a rocker member comprising a pair of parallel bars, each of said bars consisting of an elongated plate extending lengthwise of the vehicle and vertically as to their breadths, bearing blocks between said plates to aid in securing them together and to maintain them in spaced relation to each other through their lengths, said bearing blocks being positioned so as to permit a side bar of the frame to extend down between said parallel bars, a bracket between said parallel bars near their mid-length, means to secure said bracket to the side bar of that side of the vehicle frame, said bracket being provided with a bearing, a shaft extending through said parallel bars and through said bearing of said bracket to permit said rocker members to oscillate with relation to the vehicle frame, and resilient supports operating between the running gear of the vehicle and the end portions of said rocker member.

2. In a four-wheel truck for motor vehicles, a rocker member comprising a pair of parallel bars extending lengthwise of the vehicle, a bearing block near each end of said member between said bars, bearing blocks near the mid-length of said member and between the bars thereof to co-operate with the bearing blocks near the ends thereof, a vehicle spring fastened at one end to one of the end shackles and at its other end of the cooperating shackle near the center of the rocker member, one of said shackles being a fixed shackle and the other shackle having a horizontally extending slidable shank, a co-operating similarly arranged vehicle spring fastened to the shackles of the other half of the rocking member, means to support said vehicle springs on the axles of the vehicle, and supporting means extending downwardly from the vehicle frame between the bars of said rocking member and pivotally connected to said rocking member.

ELMER S. CROCKER.